US011342801B2

(12) United States Patent
Du et al.

(10) Patent No.: US 11,342,801 B2
(45) Date of Patent: May 24, 2022

(54) STATOR FOR MOTOR AND MOTOR

(71) Applicant: FORD GLOBAL TECHNOLOGIES, LLC, Dearborn, MI (US)

(72) Inventors: Guohua Du, Jiangsu (CN); Yigang Yuan, Jiangsu (CN); Chuan Deng, Jiangsu (CN); Xusheng Zhang, Jiangsu (CN); Joy Gong, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 352 days.

(21) Appl. No.: 16/728,396

(22) Filed: Dec. 27, 2019

(65) Prior Publication Data
US 2020/0212734 A1 Jul. 2, 2020

(30) Foreign Application Priority Data
Dec. 28, 2018 (CN) .......................... 201811620684.X

(51) Int. Cl.
*H02K 1/16* (2006.01)
(52) U.S. Cl.
CPC ......... *H02K 1/165* (2013.01); *H02K 2213/03* (2013.01)
(58) Field of Classification Search
CPC ..... H02K 1/165; H02K 2213/03; H02K 3/487
USPC .......... 310/214, 216.069, 216.071, 216.072, 310/216.019, 216.106, 187, 216.129, 310/216.008, 216.009, 216.077, 216.097, 310/216.111, 216.119
See application file for complete search history.

(56) References Cited

U.S. PATENT DOCUMENTS

| 8,344,581 | B2 * | 1/2013 | Yabe ..................... H02K 17/205 |
| | | | 310/212 |
| 8,816,560 | B2 | 8/2014 | Lee et al. |
| 9,800,100 | B2 * | 10/2017 | Nakano ..................... H02K 5/06 |
| 9,825,508 | B2 * | 11/2017 | Kainuma ................. H02K 9/20 |
| 10,910,892 | B2 * | 2/2021 | Hirotani ................... H02K 3/32 |
| 11,201,529 | B2 * | 12/2021 | Asano ....................... H02K 3/47 |
| 2003/0201687 | A1 | 10/2003 | Asai |

(Continued)

FOREIGN PATENT DOCUMENTS

| CN | 207743838 U | 8/2018 |
| GB | 1500253 A | 6/1976 |
| JP | 2002142391 A | 5/2002 |

OTHER PUBLICATIONS

Lejerskog, Eric et al., "Detailed Study of Closed Stator Slots for a Direct-Driven Synchronous Permanent Magnet Linear Wave Energy Converter" published Jan. 23, 2014, Open Access: Machines pp. 73-86.

*Primary Examiner* — Maged M Almawri
(74) *Attorney, Agent, or Firm* — Brooks Kushman PC; David Kelley

(57) ABSTRACT

An electric machine operable as a motor or generator includes a stator having a body portion substantially in the shape of a hollow column with an outer wall and an inner wall. The body portion has a plurality of first slots and a plurality of second slots each running through the body portion in a longitudinal direction. The plurality of first slots are distributed in a circumferential direction between the outer wall and the inner wall, and the first slots are circumferentially closed slots. The plurality of second slots are distributed in the circumferential direction between the first slots and the inner wall, and the second slots are circumferentially closed slots and are spaced apart from the first slots.

13 Claims, 5 Drawing Sheets

(56) References Cited

U.S. PATENT DOCUMENTS

| | | | |
|---|---|---|---|
| 2004/0135441 A1* | 7/2004 | Groening | H02K 1/20 310/58 |
| 2004/0183393 A1* | 9/2004 | Suzuki | H02K 1/148 310/216.008 |
| 2004/0207285 A1* | 10/2004 | Lee | H02K 15/0018 310/216.069 |
| 2005/0110361 A1* | 5/2005 | Blouin | H02K 15/06 310/216.012 |
| 2006/0071573 A1* | 4/2006 | Fujita | H02K 3/14 310/216.106 |
| 2006/0290225 A1* | 12/2006 | Mipo | H02K 1/16 310/216.069 |
| 2007/0024249 A1* | 2/2007 | Dooley | H02K 3/16 310/216.106 |
| 2007/0075604 A1* | 4/2007 | Hsu | H02K 15/066 310/216.023 |
| 2008/0282531 A1 | 11/2008 | Rahman et al. | |
| 2010/0019626 A1* | 1/2010 | Stout | H02K 1/278 310/214 |
| 2010/0026132 A1* | 2/2010 | Ooiwa | H02K 3/12 310/201 |
| 2010/0045134 A1* | 2/2010 | Ciampolini | B60K 6/20 310/201 |
| 2010/0090557 A1* | 4/2010 | El-Refaie | H02K 21/22 310/198 |
| 2011/0140562 A1* | 6/2011 | Kato | H02K 1/2746 310/216.106 |
| 2011/0175482 A1* | 7/2011 | Savagian | H02K 1/16 310/216.096 |
| 2011/0198962 A1* | 8/2011 | Tang | H02K 3/28 310/216.069 |
| 2012/0007463 A1* | 1/2012 | Taniguchi | H02K 1/165 310/216.051 |
| 2012/0019096 A1* | 1/2012 | Taniguchi | H02K 1/165 310/216.069 |
| 2012/0074797 A1* | 3/2012 | Petter | H02K 1/165 29/598 |
| 2012/0104895 A1* | 5/2012 | Ramu | H02K 1/14 310/216.106 |
| 2012/0293034 A1* | 11/2012 | Stabenow | H02K 3/34 310/201 |
| 2013/0169097 A1* | 7/2013 | Saban | H02K 1/278 310/152 |
| 2013/0199249 A1* | 8/2013 | In | H02K 1/165 310/216.008 |
| 2014/0125186 A1* | 5/2014 | Takahashi | H02K 3/12 310/202 |
| 2014/0145547 A1* | 5/2014 | Nakano | H02K 29/03 310/216.069 |
| 2015/0084457 A1* | 3/2015 | Lang | H02K 1/32 29/596 |
| 2016/0172918 A1* | 6/2016 | Hirotani | H02K 3/28 310/198 |
| 2016/0218571 A1* | 7/2016 | Kusase | H02K 1/2786 |
| 2017/0237324 A1* | 8/2017 | Terasawa | H02K 17/26 310/216.001 |
| 2018/0115202 A1* | 4/2018 | Hirotani | H02K 3/48 |
| 2018/0212501 A1* | 7/2018 | Mayor | H02K 17/185 |
| 2018/0226846 A1* | 8/2018 | Tsuiki | H02K 1/165 |
| 2019/0036393 A1* | 1/2019 | Channapatana | H02K 1/20 |
| 2019/0097474 A1* | 3/2019 | Hirotani | H02K 1/18 |
| 2019/0372416 A1* | 12/2019 | Anghel | H02K 1/165 |
| 2020/0106311 A1* | 4/2020 | Naito | H02K 1/276 |
| 2020/0106312 A1* | 4/2020 | Taniguchi | H02K 1/02 |
| 2020/0119630 A1* | 4/2020 | Asano | H02K 21/44 |
| 2020/0358329 A1* | 11/2020 | Fukuda | H02K 3/34 |
| 2020/0373803 A1* | 11/2020 | Stoll | H02K 3/48 |
| 2021/0135524 A1* | 5/2021 | Porcher | H02K 1/28 |
| 2021/0218301 A1* | 7/2021 | Kitao | H02K 1/02 |

* cited by examiner

STATOR FOR MOTOR AND MOTOR

CROSS-REFERENCE TO RELATED APPLICATIONS

This application claims foreign priority benefits under 35 U.S.C. § 119(a)-(d) to CN Application 2018 116 206 84.X filed Dec. 28, 2018, which is hereby incorporated by reference in its entirety.

TECHNICAL FIELD

The present application relates to electric motors and components, such as stators.

BACKGROUND

Drive motors provide torque for all-electric vehicles and hybrid electric vehicles to drive wheels. A motor usually comprises a stator and a rotor. The stator comprises a stator core formed by silicon steel sheets through stacking and windings placed in stator slots that can generate a magnetic field when powered. The rotor comprises a rotor core and a permanent magnet. The magnetic field generated by the stator windings can act with the rotor magnetic field generated by the permanent magnet to generate torque to achieve the conversion of electromechanical energy.

In conventional motors, stator slots are generally designed as open slots to meet the requirements of wire insertion. The open slot structure will aggravate a torque ripple of motors and cause problems such as noise and vibration.

SUMMARY

Focusing on at least one of the above problems, the present application provides an improved stator structure, which can reduce the amplitude of a torque ripple, improve the stiffness of the stator core, and reduce the weight of the stator core.

According to one aspect of the present application, the present application provides a stator for a motor. The stator comprises a body portion substantially in the shape of a hollow column, and the body portion has an outer wall and an inner wall. The body portion has a plurality of first slots and a plurality of second slots each running through the body portion in a longitudinal direction. The plurality of first slots are distributed in a circumferential direction between the outer wall and the inner wall, and the first slots are circumferentially closed slots. The plurality of second slots are distributed in the circumferential direction between the first slots and the inner wall, and the second slots are circumferentially closed slots and are spaced apart from the first slots.

In some embodiments, a cross section of the second slot is a narrow rectangle extending in the circumferential direction of the stator, the width thereof in the circumferential direction is greater than the length thereof in a radial direction, and the length of the second slot is less than the length of the first slot in the radial direction. The length of the first slot is in a range of about 10 mm to about 20 mm, and the width of the first slot is in a range of about 2 mm to about 5 mm. The length of the second slot is in a range of about 0.1 mm to about 0.3 mm, and the width of the second slot is in a range of about 1 mm to about 2 mm.

In some embodiments, the second slot has a cross section in a rectangular shape, a circular shape, a trapezoidal shape, other closed shapes formed by curved lines and straight lines, or shapes formed by combinations thereof.

In some embodiments, the ratio of the length of the second slot in a radial direction to the radial distance between the first slot and the inner wall is at least 15%.

In some embodiments, one first slot corresponds to two second slots, and the corresponding two second slots are symmetrically arranged on two sides relative to the radius passing through the center of the first slot. The ratio of the sum of the widths of the corresponding two second slots in the circumferential direction and the distance between the corresponding two second slots to the width of the first slot in the circumferential direction is in a range of about 30% to about 60%.

In some embodiments, one first slot may correspond to one second slot, and the radius passing through the center of the corresponding second slot coincides with the radius passing through the center of the first slot. The ratio of the width of the second slot in the circumferential direction to the width of the first slot in the circumferential direction is in a range of about 30% to about 60%.

According to one aspect of the present application, a motor comprises a stator and a rotor with the stator having an outer wall and an inner wall, and the inner wall defining a hollow cavity. A plurality of first slots are distributed in a circumferential direction between the outer wall and the inner wall of the stator, and the first slots are circumferentially closed slots and are used for accommodating windings. A plurality of second slots are distributed in the circumferential direction between the inner wall of the stator and the first slots, and the second slots and the first slots do not communicate with the cavity. The rotor is accommodated in the cavity of the stator, and the rotor and the inner wall of the stator define an air gap.

In some embodiments, the first slot has a rectangular cross section and the windings are square windings.

In some embodiments, the ratio of the length of the second slot in a radial direction to the radial distance between the first slot and the inner wall is at least 15%, and the ratio of the width of the second slot in the circumferential direction to the width of the first slot in the circumferential direction is in a range of about 30% to about 60%.

In some embodiments, the stator is formed by a plurality of substantially annular laminates through stacking in a longitudinal direction; the laminate has an outer edge and an inner edge, and the outer edges and inner edges of the plurality of laminates respectively form the outer wall and inner wall of the stator. The laminates each have a plurality of first holes and a plurality of second holes distributed in the circumferential direction between the outer edges and the inner edges thereof, the first holes and second holes of the plurality of laminates are superposed in the longitudinal direction to respectively form the first slots and second slots, the first holes and the second holes are all circumferentially closed holes, and the second holes are located between the inner edges of the laminates and the first holes.

According to another aspect of the present application, the present application provides a stator for a motor. The stator comprises a plurality of laminates stacked in a longitudinal direction, and the laminate is substantially annular and has an inner edge and an outer edge A plurality of first holes are distributed in a circumferential direction between the inner edge and the outer edge, and the first holes are circumferentially closed holes. A plurality of second holes are distributed in the circumferential direction between the inner edge and the first holes, and the second holes are circumferentially closed holes and are spaced apart from the first holes and the inner edge.

In some embodiments, the ratio of the length of the second hole in a radial direction to the radial distance between the first hole and the inner edge is at least 15%.

In some embodiments, the length of the first hole in a radial direction is in a range of about 10 mm to about 20 mm, and the width of the first hole in the circumferential direction is in a range of about 2 mm to about 5 mm. The length of the second hole in the radial direction is in a range of about 0.1 mm to about 0.3 mm, and the width of the second hole in the circumferential direction is in a range of about 1 mm to about 2 mm.

In some embodiments, the second hole is in a rectangular shape, a circular shape, a trapezoidal shape, other closed shapes formed by curved lines and straight lines, or shapes formed by combinations thereof.

In some embodiments, one first hole corresponds to a plurality of second holes, and these second holes are symmetrically distributed relative to the radial centerline of the first hole.

In some embodiments, one first hole corresponds to one second hole, and the radial centerline of this second hole coincides with the radial centerline of this first hole.

In some embodiments, the outer edges and inner edges of the plurality of laminates respectively form an outer wall and an inner wall of the stator, and the inner wall defines a cavity for accommodating a rotor. The first holes of the plurality of laminates are superposed in the longitudinal direction to form a plurality of first slots for accommodating windings of the motor, and the second holes of the plurality of laminates are superposed in the longitudinal direction to form a plurality of second slots.

It should be understood that providing the above brief description for introducing in a simplified form the concept of a series of options to be further described in the detailed description does not mean identifying key or basic features of the protected subject matter as recited by the claims as filed or subsequently amended. Furthermore, the protected subject matter is not limited to the implementation modes that overcome any shortcomings described above or in any part of this description.

In conjunction with the accompanying drawings, according to one or a plurality of embodiments described in detail below, one or a plurality of features and advantages of one or more embodiments within the scope of the claims will become apparent.

DETAILED DESCRIPTION

Figure 1:
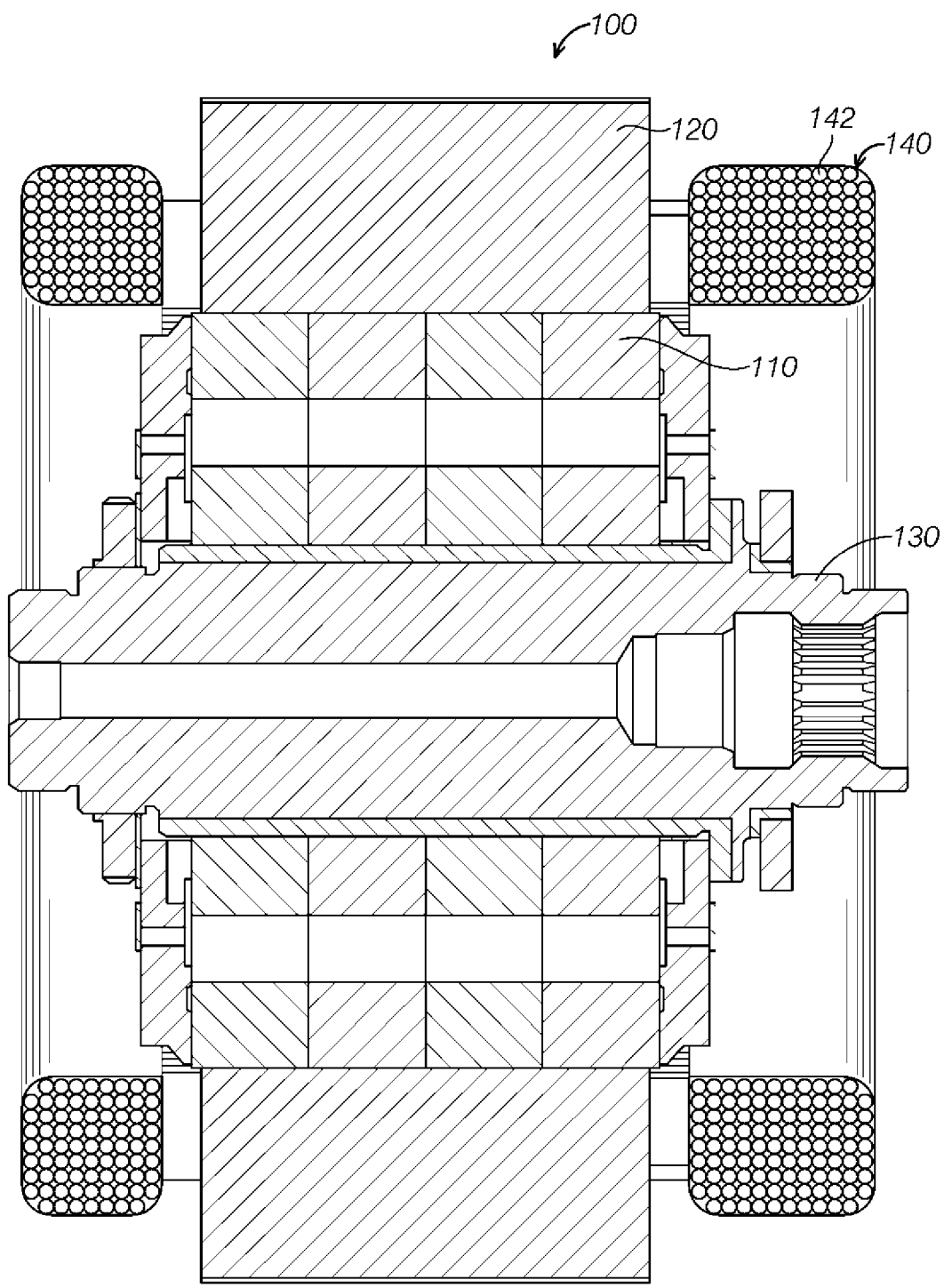
FIG. 1 is a cross-sectional view of a motor according to one embodiment of the present application.

As required, specific embodiments of the present invention are disclosed in the description of the present application. However, it should be understood that the embodiments disclosed herein are only examples of the present invention that can be implemented in a variety of alternative forms. The drawings need not be drawn in proportion; features may be expanded or reduced to show details of specific components. The same or similar reference numerals may indicate the same parameters and components or similar modifications and substitutes. In the following description, a plurality of operating parameters and components are described in a plurality of conceived embodiments. These specific parameters and components are only examples in this description and do not imply limitations. Therefore, the specific structural and functional details disclosed in this description should not be construed as restrictions, but as a representative basis for instructing one skilled in the art to implement the present invention in various forms.

In motors used as electric motors and generators, the flux generated by stator windings and the flux generated by a rotor are distributed in an air gap between the rotor and the stator. The greatest component of the two flux distributions is referred to as a fundamental component. During normal operation of the motor, the fundamental flux of the stator and the fundamental flux of the rotor rotate at the same speed in the same direction, and their interaction produces constant or uniform torque. Since the slots for accommodating wire windings in the conventional stator are open, the inner wall of the stator is caused to be discontinuous, so the air gap permeance is not constant, which leads to the air gap magnetic field ripple and the torque ripple of the motor. When the motor is used as a generator, the torque ripple may lead to the oscillation of the torque output speed of the motor. When the motor is used to generate a torque in the power system of an electric vehicle, the torque ripple may lead to the oscillation of the speed of the transmission system. For most applications, especially for power systems of electric vehicles (EV) or hybrid electric vehicles (HEV), it is desirable to reduce the torque ripple to a manageable level.

Therefore, in the following embodiments, the inventor of the present application discloses a motor with an improved stator structure, which can reduce the air gap magnetic field ripple and cogging torque, reduce the amplitude of the torque ripple, and thus obtain improved noise, vibration, and harshness (NVH) performance.

Figure 2:
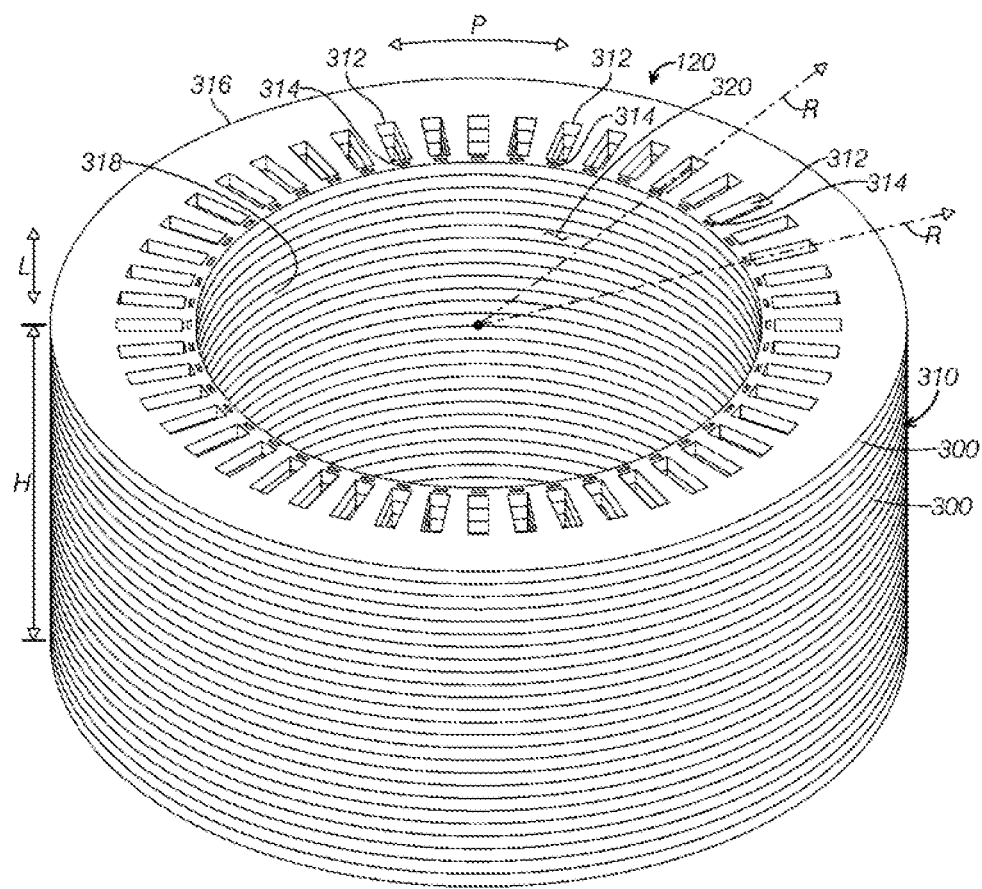
FIG. 2 is a schematic perspective view of a motor stator according to one embodiment of the present invention, and illustrates a stator formed by a plurality of laminates stacked in a longitudinal direction.
Figure 3:
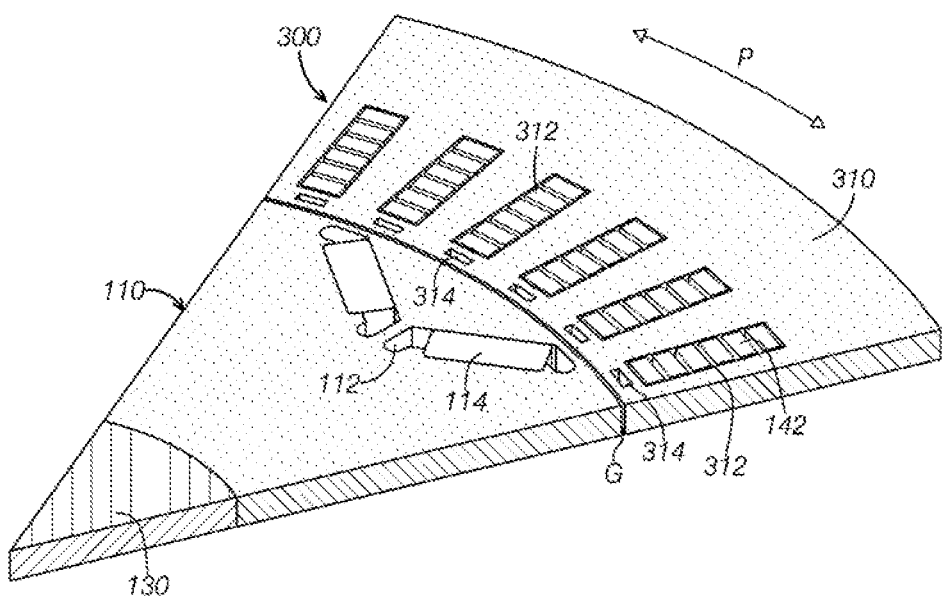
FIG. 3 is a schematic perspective view of a part of the motor in FIG. 1, and illustrates a part of stator and rotor laminates.

FIG. 1 illustrates a cross-sectional view of an electric machine 100, and FIG. 2 is a schematic perspective view of a stator 120 of the electric machine or motor 100 in FIG. 1, in which windings are not shown to better illustrate the structure of the stator 120. FIG. 3 illustrates a laminate of the motor 100. With reference to FIG. 1 and FIG. 3, the motor 100 comprises a rotor 110 and the stator 120, and the rotor 110 is mechanically connected to a shaft 130 of an EV or HEV transmission device (not shown). The rotor 110 comprises an accommodating portion 112, permanent magnets 114 are arranged in the accommodating portion 112, and the permanent magnets 114 may be arranged in pairs to form magnetic poles.

With reference to FIGS. 2 and 3, the stator 120 comprises a body 310 substantially in the shape of a hollow column, which defines a hollow cavity 320, and the rotor 110 is located in the cavity 320. The body 310 of the stator 120 comprises two groups of slots, such as a plurality of first slots 312 and a plurality of second slots 314, arranged in a circumferential direction P of the body 310. The first slot 312 may have a larger cross-sectional area than the second slot 314. Windings 140 are accommodated in the first slots 312 and the windings 140 are not accommodated in the second slots 314. The first slots 312 may run through the body 310 of the stator 120 in a longitudinal direction L. A conductor 142 passes through the plurality of first slots 312 to form the windings 140. A magnetic field generated by the powered windings 140 in the stator 120 can cooperate with the permanent magnets 114 on the rotor 110 to enable the rotor 110 to rotate in the stator 120, thus driving the shaft 130 to rotate.

The windings 140 may be multilayer windings formed by a solid conductor 142 that repeatedly passes through the plurality of first slots 312, or multilayer windings formed by a plurality of separate conductors connected at the ends of the first slots 312. The conductor 142 may have a square or circular cross section. In some embodiments, with reference to FIG. 3, the first slot 312 has a rectangular cross section, and the conductor 140 may have a rectangular or square cross section, that is, the stator 120 can be applied to flat copper wire motors.

It should be understood that, although the electric machine 100 is described as a motor, it is also operable as a generator, and that the rotor 110 and the stator 120 cooperate to convert electrical energy into mechanical movement when operating as a motor, the electric machine 100 can also operate as a generator that converts mechanical movement of the shaft 130 into electrical energy.

With reference to FIG. 2, the stator 120 may be formed by a plurality of laminates 300 stacked in the longitudinal direction L. The longitudinal direction L may be the stacking direction of the laminates 300, for example, the vertical direction illustrated in FIG. 2. The body 310 of the stator 120 has an outer wall 316 and an inner wall 318, and the inner wall 318 forms a cavity 320 for accommodating the rotor 110. Two groups of slots are arranged between the outer wall 316 and the inner wall 318 of the body 310, i.e., a plurality of first slots 312 and a plurality of second slots 314 arranged in the circumferential direction P of the body 310. The circumferential direction P is the circumferential direction of the cross section of the body 310 of the stator 120 or the circumferential direction of the laminates 300 of the stator 120.

The first slots 312 run through the body 310 in the longitudinal direction L of the body 310 and are used for accommodating the windings 140. The first slots 312 may be long slots extending in the radial direction R of the body 310. The two ends are at certain distances to the outer wall 316 and the inner wall 318 of the body 310 in the radial direction R. That is to say, the first slots 312 are circumferentially closed longitudinal slots, also referred to as closed slots, which are not open relative to the outer wall 316 and the inner wall 318. In other words, the first slots 312 do not communicate with the cavity 320.

The second slots 314 are circumferentially closed slots and are located between the inner wall 318 and the first slots 312. That is to say, the two ends of the second slots 314 are at certain distances to the inner wall 318 and the first slots 312 in the radial direction R, and the second slots 314 are not open relative to the inner wall 318 and the first slots 312 or are closed slots. In other words, the second slots 314 do not communicate with the cavity 320. The second slots 314 may be spaced apart from the first slots 312. That is to say, the first slots 312 and the second slots 314 are closed slots independent of each other, and do not communicate with each other. The second slots 314 may be long slots extending in the circumferential direction P of the body 310, and have a smaller cross-sectional area than the first slots 312. The second slots 314 run through the body 310 in the longitudinal direction L.

As described above, the first slots 312 and the second slots 314 are all closed slots, and the inner wall 318 of the body 310 defines the uniform continuous cylindrical cavity 320. The inner wall 318 of the stator body 310 and the outer wall of the rotor further define an air gap G (refer to FIG. 3). The stator 120 is a structure without a notch when facing the air gap, which can reduce air gap magnetic field ripple and cogging torque, thereby reducing the amplitude of the torque ripple and improving the NVH performance. In addition, due to the use of closed slots, the air gap G between the stator and the rotor is uniform, which can eliminate the air flow changes during the operation of the rotor, and is conducive to alleviating the gas noise in the operation process. In addition, the continuous inner wall 318 can provide improved stiffness, which is conducive to further reducing the cogging vibration. In addition, the second slots 314 are distributed near the air gap side and may be sized to further reduce the torque ripple, especially a peak-to-peak torque ripple and a sixth-order torque ripple, and to reduce the adverse effect of a conventional closed slot structure on the magnetic performance of the motor. The additional second slots 314 can reduce the overall weight of the stator 120, thus providing improved mechanical performance.

Figure 4A:
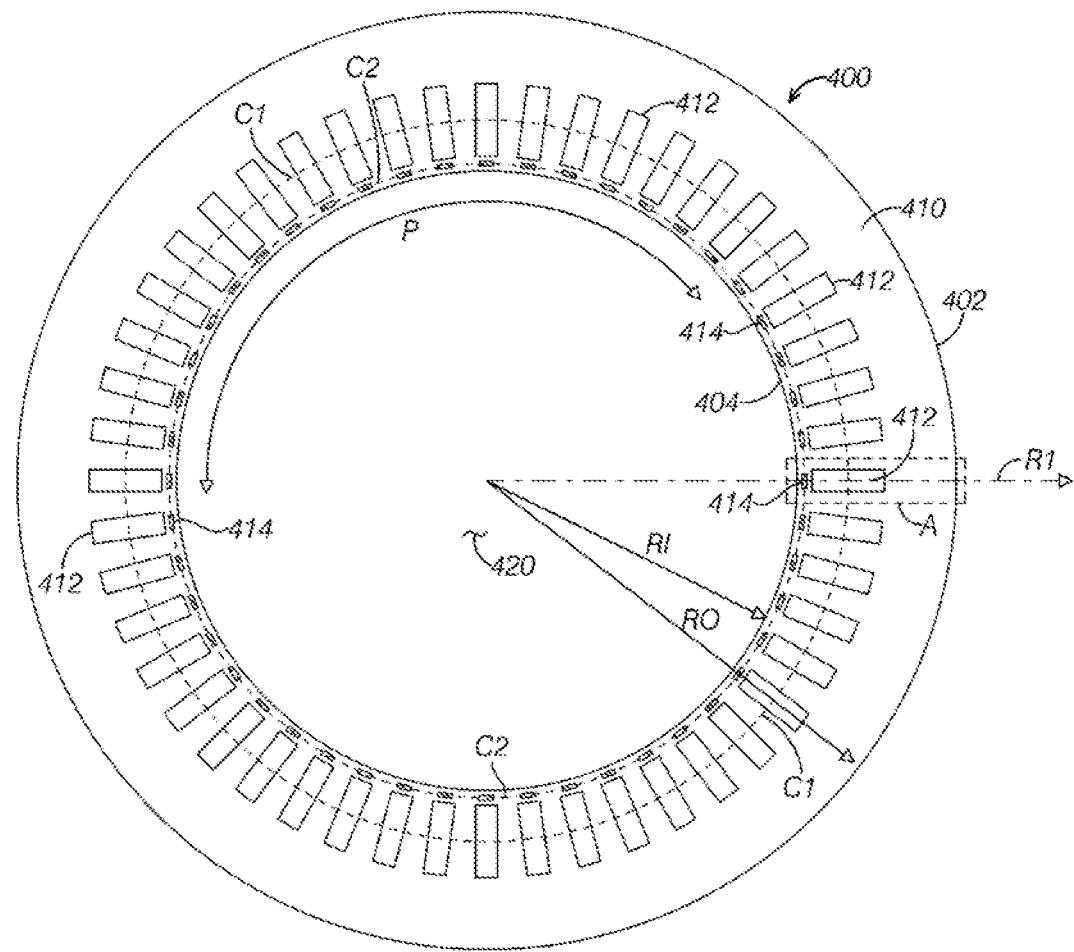
FIG. 4A is a schematic cross-sectional view of a laminate of the motor stator in FIG. 2.
Figure 4B:
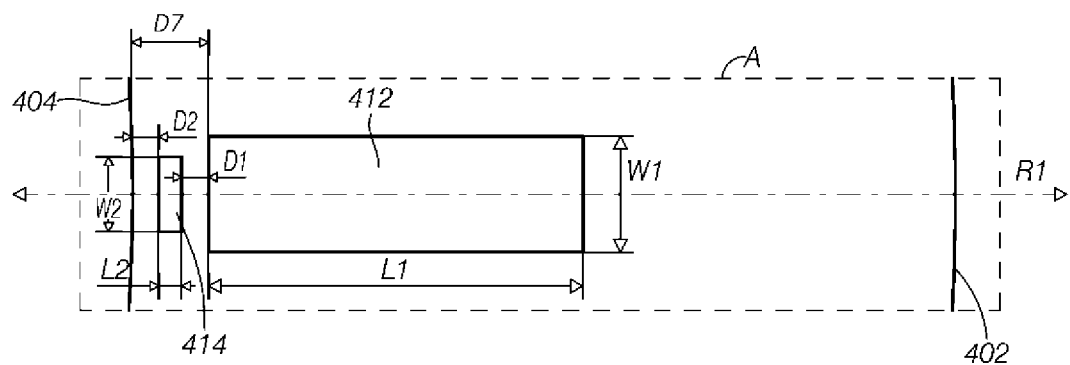
FIG. 4B is a schematic enlarged view of part A of the laminate in FIG. 4A.

FIG. 4A is a cross-sectional view of one laminate 300 in FIG. 2, and FIG. 4B is a schematic enlarged view of part A in FIG. 4A. With reference to FIGS. 4A and 4B, the laminate 300 is substantially annular and has a hollow body 410, the body 410 comprises an outer edge 402 and an inner edge 404, and the inner edge 414 defines an opening 420. The outer edge 402 and the inner edge 404 can respectively define the outer radius RO and the inner radius RI of the annular laminate 300. In some embodiments, RO may be in a range of about 90 mm to about 130 mm, for example, about 100 mm. RI may be in a range of about 80 mm to about 100 mm, for example, about 90 mm.

The body 410 comprises two groups of holes or openings, i.e., a plurality of first holes 412 and a plurality of second holes 414, distributed in the circumferential direction P between the outer edge 402 and the inner edge 404. The second holes 414 are located between the inner edge 404 and the first holes 412. The first holes 412 and the second holes 414 are all holes closed in the circumferential direction, i.e., the first holes 412 are closed openings relative to the outer edge 402 and the inner edge 404, and the two ends of the first holes 412 are spaced apart from the outer edge 402 and the inner edge 404, respectively; and the second holes 414 are closed openings relative to the inner edge 404, and the ends facing the center of the laminate are spaced apart from the inner edge 404, or the second holes 414 do not communicate with the opening 420. The first holes 412 and the second holes 414 are holes independent of each other and spaced apart from each other, that is, the first holes 412 and the second holes 414 do not communicate with each other.

The plurality of first holes 412 may be arranged uniformly in the circumferential direction P, and the connecting line of the centers can form a first circle C1. The plurality of second holes 414 may be arranged uniformly in the circumferential direction P, and the connecting line of the centers can form a second circle C2. That is to say, the connecting line of the centers of the plurality of first holes 412 and the connecting line of the centers of the plurality of second holes 414 can form the first circle C1 and the second circle C2 in the circumferential direction P. The radius and area of the first circle C1 are larger than those of the second circle C2. The second circle C2 may be located in the first circle C1.

In some embodiments, with reference to FIG. 4A, each first hole 412 may correspond to one second hole 414. In some embodiments, the radius passing through the center of the first hole 412 coincides with the radius passing through the second hole 414, i.e., they are the same radius connecting line R1. The first hole 412 and the second hole 414 may each be symmetrical relative to the radius connecting line R1. In other words, the parts of the first holes 412 on the two sides of the radius connecting line R1 present a mirror distribution relative to the radius connecting line R1, and the parts of the second holes 414 on the two sides of the radius connecting line R1 present a mirror distribution relative to the radius connecting line R1.

With reference to FIG. 4B, the first holes 412 may be openings extending in the radial direction R, and may be in a rectangular shape, a circular shape, a trapezoidal shape, other closed shapes formed by curved lines and straight lines, or shapes formed by combinations thereof. In the illustrated embodiment, the first hole 412 is in a rectangular shape. The size (for example, the length) of the first hole 412 in the radial direction is L1 and the size (for example, the width) in the circumferential direction is W1. In some embodiments, the radial length L1 may be in a range of about 10 mm to about 20 mm, for example, about 14 mm, and the circumferential width W1 may be in a range of about 2 mm to about 5 mm, for example about 3.3 mm.

With reference to FIG. 4B, the second holes 414 may be slender openings extending in the circumferential direction R, and may be in a rectangular shape, a circular shape, a trapezoidal shape, other closed shapes formed by curved lines and straight lines, or shapes formed by combinations thereof. In the illustrated embodiment, the second hole 414 is in a rectangular shape extending in the circumferential direction. The length of the second hole 414 in the radial direction is L2 and the width in the circumferential direction is W2. In some embodiments, the radial length L2 may be in a range of about 0.1 mm to about 0.3 mm, for example, about 0.2 mm, and the circumferential width W2 may be in a range of about 1 mm to about 2 mm, for example about 1.4 mm. The sizes (the length L2 and the width W2) of the second hole 414 in the circumferential direction P and the radial direction R may be smaller than that (the length L1 and the width W1) of the first hole 412 in the circumferential direction P and the radial direction R respectively, and the area of the second hole 414 may be smaller than that of the first hole 412.

In some embodiments, in the radial direction, the distance between the first hole 412 and the second hole 414 is D1, the distance between the second hole 414 and the inner edge 404 is D2, D1 may be in a range of about 0.2 mm to about 0.7 mm, for example, about 0.5 mm, and D2 may be in a range of about 0.2 mm to about 0.7 mm, for example, about 0.5 mm. The ratio of the circumferential width W2 of the second hole 414 to the circumferential width W1 of the first hole 412 is in a range of about 30% to about 60%, i.e., W2/W1=30%-60%. The radial distance from the first hole 412 to the inner edge 404 is D7, and D7 may be the sum of D2, L2 and D1, i.e., D7=D2+L2+D1. The ratio of the radial length L2 of the second hole 414 to D7 is at least 15%, for example, 20%, i.e., L2/D7>15%. Configuration of the size of and the distance between the second holes 414 can further reduce the torque ripple and reduce the adverse effect of the closed slot structure on the magnetic performance of the motor.

The laminates 300 in FIG. 4A are stacked in the longitudinal direction L to form the stator 120 in FIG. 2. With reference to FIGS. 2 and 4A, the outer edge 402 and the inner edge 404 of the plurality of laminates 300 are superposed in the longitudinal direction L to respectively form the outer wall 316 and the inner wall 318, and the first holes 412 and the second holes 414 are superposed in the longitudinal direction L to respectively form the first slots 312 and the second slots 314. It should be understood that the shape and size of the cross section of the first slots 312 respectively correspond to the shape and size of the first hole 412, and the shape and size of the cross section of the second slot 314 respectively correspond to the shape and size of the second hole 414. Therefore, for the features (e.g., the shape, length, width, area, etc.) of the cross section of the first slot 312 and the second slot 314, reference can be made to the related description of the first hole 412 and the second hole 414 above.

Figure 5A:
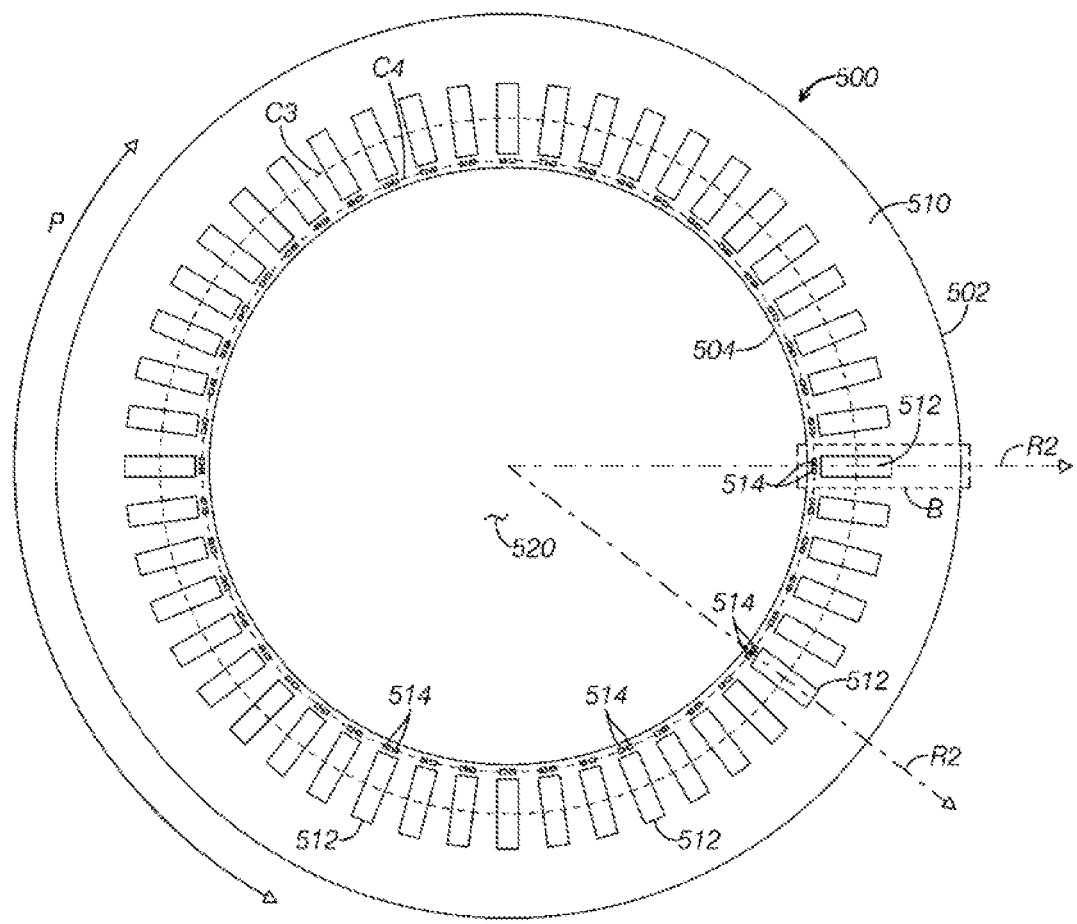
FIG. 5A is a schematic view of a laminate of a stator of a motor according to another embodiment of the present application.
Figure 5B:
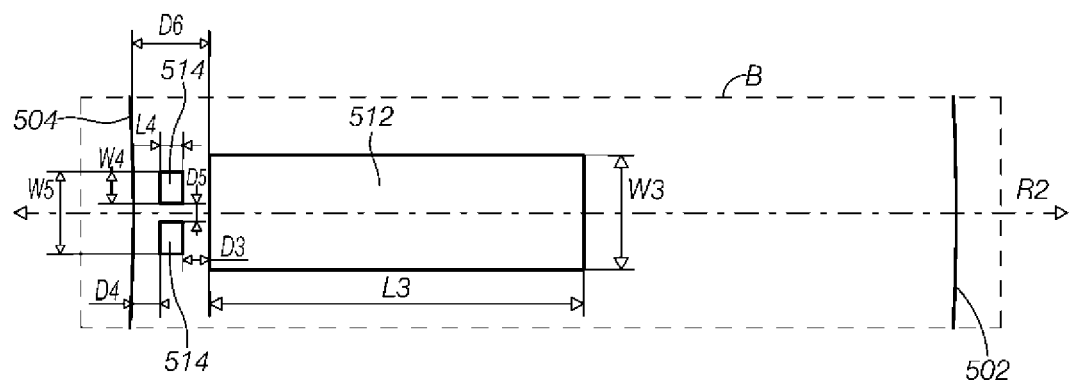
FIG. 5B is a schematic enlarged view of part B of the laminate in FIG. 5A.

FIG. 5A illustrates a laminate 500 of a stator according to another embodiment of the present invention, and FIG. 5B is a schematic enlarged view of part B of the laminate 500. With reference to FIGS. 5A and 5B, the laminate 500 is substantially annular and has a hollow body 510, the body 510 comprises an outer edge 502 and an inner edge 504, and the inner edge 504 defines an opening 520. The outer edge 502 and the inner edge 504 can define the outer diameter and the inner diameter of the annular laminate 500, respectively.

The body 510 comprises two groups of holes or openings, i.e., a plurality of first holes 512 and a plurality of second holes 514, distributed in the circumferential direction P between the outer edge 502 and the inner edge 504. The second holes 514 are located between the inner edge 502 and the first holes 512. The first holes 512 and the second holes 514 are all circumferentially closed holes, i.e., the first holes 512 are closed openings relative to the outer edge 502 and the inner edge 504, and the first holes 512 are spaced apart from the outer edge 502 and the inner edge; and the second holes 514 are closed openings relative to the inner edge 504, and the ends thereof near the center of the circle are spaced apart from the inner edge 504. In other words, the second holes 514 do not communicate with the opening 520. The first holes 512 and the second holes 514 are holes independent of each other and spaced apart from each other, that is, the first holes 512 and the second holes 514 do not communicate with each other.

The plurality of first holes 512 may be arranged uniformly in the circumferential direction P, and the centers of the radial connecting lines are connected to form a third circle C3. The plurality of second holes 518 may be arranged uniformly in the circumferential direction P, and the centers of the radial connecting lines are connected to form a fourth circle C4. The radius of the third circle C3 is larger than that of the fourth circle C4. The fourth circle C4 may be located in the third circle C3.

With reference to FIG. 5A, one first hole 512 may correspond to two second holes 514. In some embodiments, two second holes 514 present a mirror distribution on the two sides relative to the radius (i.e., the radius connecting line R2) passing through the center of the first hole 512. The first holes 412 may be symmetrical relative to the radius connecting line R2. In other words, the parts of the first holes 512 on the two sides of the radius connecting line R2 present a mirror distribution relative to the radius connecting line R2.

With reference to FIG. 5B, the first holes 512 may be openings extending in the radial direction R, and may be in a rectangular shape, a circular shape, a trapezoidal shape, other closed shapes formed by curved lines and straight lines, or shapes formed by combinations thereof. In the illustrated embodiment, the first hole 512 is in a rectangular shape. The length of the first hole 512 in the radial direction R is L3 and the width in the circumferential direction is W3. In some embodiments, the radial length L3 may be in a range of about 10 mm to about 20 mm, for example, about 14 mm, and the circumferential width W3 may be in a range of about 2 mm to about 5 mm, for example about 3.3 mm.

With reference to FIG. 5B, the second holes 514 may be slender openings extending in the circumferential direction R, and may be in a rectangular shape, a circular shape, a trapezoidal shape, other closed shapes formed by curved lines and straight lines, or shapes formed by combinations thereof. In some embodiments, the second hole 514 is in a rectangular shape, the length of the second hole 514 in the radial direction is L4, and the width is W4. In some embodiments, the radial length L4 of the second hole 514 may be in a range of about 0.1 mm to about 0.3 mm, for example, about 0.2 mm, and the circumferential width W4 may be in a range of about 0.2 mm to about 0.7 mm, for example about 0.5 mm. The sizes (the length L4 and the width W4) of the second hole 514 in the circumferential direction P and the radial direction R may be smaller than the circumferential length L3 and the circumferential width W3 of the first hole 512 respectively, and the area of the second hole 514 may be smaller than that of the first hole 512.

In the radial direction, the distance between the first hole 512 and the second hole 514 is D3, and the distance between the second hole 514 and the inner edge 502 is D4. D3 may be in a range of about 0.2 mm to about 0.7 mm, for example, about 0.5 mm, and D4 may be in a range of about 0.2 mm to about 0.7 mm, for example, about 0.5 mm. The distance between the two second holes 514 in the circumferential direction P is D5, and D5 may be in a range of about 1 mm to about 1.5 mm, for example, 1.3 mm. The width of the combination of two second holes 514 in the circumferential direction P is W5, W5 may be the sum of the circumferential widths of two second holes 514 and the circumferential distance D5 therebetween, i.e., W5=D5+2W4, and W5 may be less than W3. The ratio of W5 to the circumferential width W3 of the first hole 512 is in a range of about 30% to 60%, i.e., W5/W3=30%-60%. The radial distance from the first hole 514 to the inner edge 504 is D6, and D6 may be the sum of D4, L4 and D3, i.e., D6=D4+L4−D3. The ratio of the radial length L4 of the second hole 514 to D6 is at least 15%, for example, 20%, i.e., L4/D6>15%. Configuration of the size of and the distance between the second holes 514 can further reduce the torque ripple and reduce the adverse effect of the closed slot structure on the magnetic performance of the motor.

The laminates 500 in FIG. 5A are stacked in the longitudinal direction to form the stator (not shown), the outer edge 502 and the inner edge 504 of the plurality of laminates 500 are superposed in the longitudinal direction to respectively form the outer wall and the inner wall, and the first holes 512 and the second holes 514 are superposed in the longitudinal direction to respectively form the first slots and the second slots. The first slots have a larger cross-sectional area than the second slots and are used for accommodating windings. The second slots are close to the air gap side and may not be used for accommodating windings. For the material, thickness, quantity and sizes such as inner diameter and outer diameter of the laminates 500, reference can be made to the laminates 300 described above, which are not described here again.

It should be understood that the laminates of the motor or stator according to the present application are not limited to the laminates illustrated in FIGS. 4A and 5A. In other embodiments, the laminate has a similar annular body and first slots, and the differences lie in that the laminate may comprise three or more second slots symmetrically arranged with respect to the radial centerline of the corresponding first slot, and the sizes of the combination of these second slots in the circumferential direction may be smaller than the sizes of the corresponding first slot in the circumferential direction. These embodiments can be easily conceived of by one skilled in the art based on the above description of the present application, and should therefore also be included in the protection scope of the present application.

Figure 6:
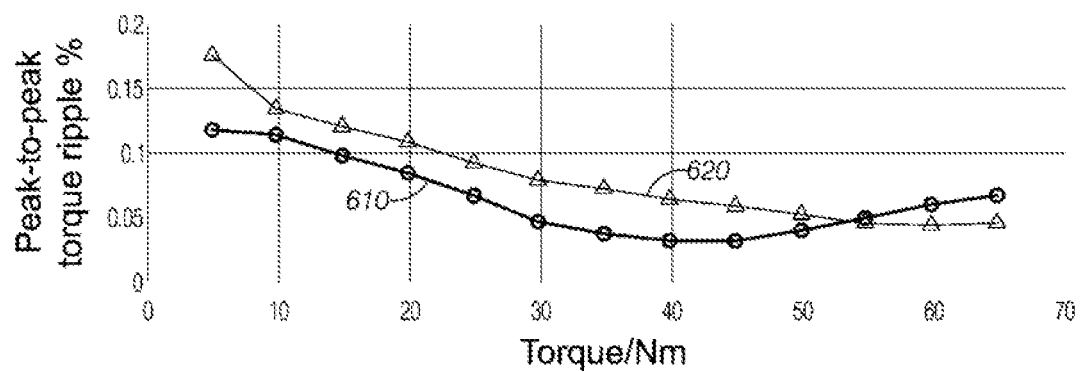
FIG. 6 is a torque ripple chart obtained through electromagnetic simulation of a motor with the stator in FIG. 2, and illustrates a relationship between peak-to-peak torque ripple percentage and torque.

FIG. 6 illustrates results of a peak-to-peak torque ripple obtained through electromagnetic simulation of the motor according to the present invention and a conventional motor. Line 610 with round dots represents a peak-to-peak torque ripple curve of the motor according to the present invention. The stator of the motor has the first slots and the second slots illustrated in FIG. 2 to FIG. 4B. Line 620 with triangular dots represents a torque ripple curve of the conventional motor with open slots. Except for the first slots and the second slots, the other features of the conventional motor are the same as those of the motor according to the present invention. With reference to FIG. 6, in a range of 90% (e.g., in a range of 5-50 Nm) of the main torque region (e.g., in a range of 0-54 Nm), the torque ripple of the motor disclosed in the embodiment of the present application can be reduced by about 25% to about 50% compared with that of the conventional motor, and is about 40% on average.

Figure 7:
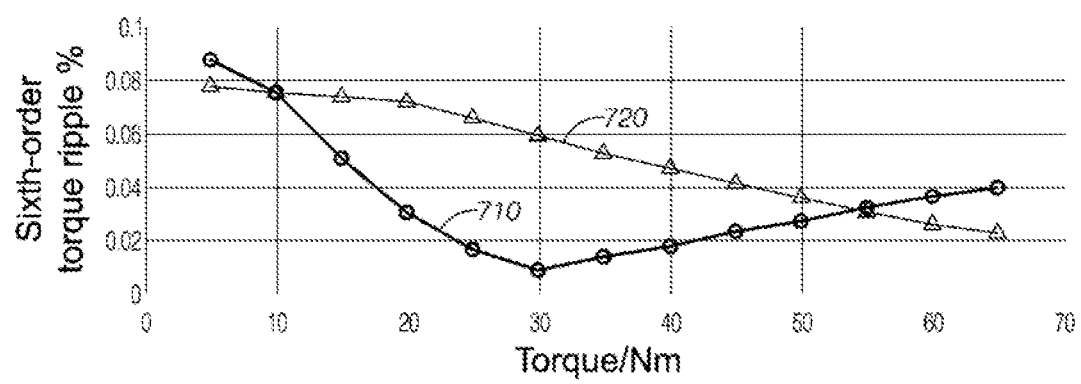
FIG. 7 is a torque ripple chart obtained through electromagnetic simulation of a motor with the stator in FIG. 2, and illustrates a relationship between sixth-order torque ripple percentage and torque.

FIG. 7 illustrates results of a sixth-order torque ripple obtained through electromagnetic simulation of the motor according to the present invention and a conventional motor. Line 710 with round dots represents a sixth-order torque ripple curve of the motor according to the present invention. The parameters of the first and second slots of the motor are the same as those of the motor according to the present invention in the experiment illustrated in FIG. 6. Line 720 with triangular dots represents a sixth-order torque ripple curve of the conventional motor. The conventional motor is the same as the conventional motor in the experiment illustrated in FIG. 6. With reference to FIG. 7, in a range of 75% (e.g., in a range of 15-45 Nm) of the main torque region (e.g., in a range of 0-54 Nm), the torque ripple of the motor disclosed in the embodiment of the present application can be reduced by about 40% to about 80% compared with that of the conventional motor, and is about 66% on average. The motor according to the present invention can significantly reduce the peak-to-peak torque ripple and the sixth-order torque ripple.

With reference to the above description, the inner wall of the stator in the present invention is uniform and continuous, does not comprises the opening facing the air gap, can reduce the air gap magnetic field ripple and the cogging torque, and therefore can reduce the amplitude of the torque ripple. In addition, the second slots distributed close to the air gap can reduce the effect of the closed slot design on magnetic performance. In addition, the continuous inner wall can provide improved stiffness, and the additional second slots can reduce the overall weight of the stator. Therefore, the motor or stator according to the embodiment of the present application can provide improved NVH performance, magnetic performance, and mechanical performance.

It should be understood that the structures and procedures disclosed in the description of the present application are exemplary and the specific embodiments should not be understood as limits, as there may be a plurality of variations. The embodiments described above are merely preferred embodiments of the present invention and are not intended to limit the present invention. For one skilled in the art, the present invention may have various modifications and changes. Any modification, equivalent replacement, improvement, etc. made within the spirit and principle of the present invention shall be included in the scope of protection of the present invention.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A stator for a motor, comprising:
   a hollow column shaped body portion having an outer wall and an inner wall and defining a plurality of first slots running through the body portion in a longitudinal direction and distributed in a circumferential direction between the outer wall and the inner wall, the plurality of first slots being circumferentially closed slots, the body portion also defining a plurality of second slots running through the body portion in the longitudinal direction and distributed in the circumferential direction between the plurality of first slots and the inner wall, the plurality of second slots being circumferentially closed slots and being spaced apart from the plurality of first slots, wherein length of each of the plurality of first slots is in a range between 10 mm to 20 mm, and width of each first slot is in a range of 2 mm to 5 mm; and wherein length of each second slot is in a range of between 0.1 mm to 0.3 mm, and width of each second slot is in a range of between 1 mm to 2 mm.

2. The stator according to claim 1, wherein each of the plurality of second slots has a rectangular cross section extending in the circumferential direction of the stator, a width of the rectangular cross section in the circumferential direction being greater than length thereof in a radial direction, and length of each second slot being less than length of each of the plurality of first slots in the radial direction.

3. The stator according to claim 1, wherein each second slot has one of a rectangular cross section, a circular cross section, a trapezoidal cross section, or a cross section formed by a combination thereof.

4. The stator according to claim 1, wherein a ratio of length of each second slot in a radial direction to a radial distance between each first slot and the inner wall is at least 15%.

5. The stator according to claim 1, wherein each of the plurality of first slots corresponds to one unique second slot, and a radius passing through a center of the corresponding unique second slot coincides with a radius passing through a center of the corresponding first slot.

6. The stator according to claim 5, wherein a ratio of a width of the second slot in the circumferential direction to a width of the corresponding first slot in the circumferential direction is in a range of between 30% and 60%.

7. A stator for a motor, comprising:
   a hollow column shaped body portion having an outer wall and an inner wall and defining a plurality of first slots running through the body portion in a longitudinal direction and distributed in a circumferential direction between the outer wall and the inner wall, the plurality of first slots being circumferentially closed slots, the body portion also defining a plurality of second slots running through the body portion in the longitudinal direction and distributed in the circumferential direction between the plurality of first slots and the inner wall, the plurality of second slots being circumferentially closed slots and being spaced apart from the plurality of the first slots;
   wherein each first slot corresponds to two unique second slots, and the corresponding unique two second slots are symmetrically arranged on two sides relative to a radius passing through a center of the corresponding first slot; and
   wherein a ratio of a sum of the widths of the corresponding two unique second slots in the circumferential direction and the distance between the corresponding two unique second slots to the width of the corresponding first slot in the circumferential direction is in a range pf between 30% and 60%.

8. A stator for a motor, comprising:
   a plurality of annular laminates stacked in a longitudinal direction, each laminate having an inner edge and an outer edge and comprising:
   a plurality of first holes distributed in a circumferential direction between the inner edge and the outer edge, the first holes being circumferentially closed holes; and a plurality of second holes distributed in the circumferential direction between the inner edge and the first holes, the second holes being circumferentially closed holes and being spaced apart from the first holes and the inner edge, wherein length of each first hole in a radial direction is in a range of 10 mm to 20 mm, and width of each first hole in a circumferential direction is in a range of 2 mm to 5 mm; and length of each second hole in a radial direction is in a range of 0.1 mm to 0.3 mm, and a width of each second hole in a circumferential direction is in a range of 1 mm to 2 mm.

9. The stator according to claim 8, wherein a ratio of length of each second hole in a radial direction to radial distance between each first hole and the inner edge is at least 15%.

10. The stator according to claim 8, wherein the second hole is rectangular, circular, trapezoidal, or a combination thereof.

11. The stator according to claim 8, wherein each first hole corresponds to a unique plurality of second holes symmetrically distributed relative to a radial centerline of the corresponding first hole.

12. The stator according to claim 8, wherein one first hole corresponds to only one second hole, and a radial centerline of each second hole coincides with the radial centerline of the corresponding first hole.

13. The stator according to claim 8, wherein the outer edges and inner edges of the plurality of laminates respectively form an outer wall and an inner wall of the stator, and the inner wall defines a cavity for accommodating a rotor; and the first holes of the plurality of laminates are superposed in the longitudinal direction to form a plurality of first slots for accommodating windings of the motor, and the second holes of the plurality of laminates are superposed in the longitudinal direction to form a plurality of second slots.

\* \* \* \* \*